United States Patent [19]

Hälg et al.

[11] Patent Number: 4,900,601
[45] Date of Patent: Feb. 13, 1990

[54] MULTI-LAYER BODY STRUCTURE FOR THE REINFORCEMENT OF A PANEL AND A METHOD OF REINFORCING A PANEL

[75] Inventors: Paul Hälg, Richterswil; Paul Rohrer, Herrliberg, both of Switzerland

[73] Assignee: Gurit Essex AG, Freienbach, Switzerland

[21] Appl. No.: 205,449

[22] Filed: Jun. 10, 1988

[30] Foreign Application Priority Data

Jun. 19, 1987 [DE] Fed. Rep. of Germany ....... 3720267

[51] Int. Cl.⁴ .................................................. B32B 1/04
[52] U.S. Cl. .......................................... 428/68; 428/47;
428/76; 428/251; 428/285; 428/286; 428/249;
428/413; 428/415; 428/423.1; 428/425.6;
428/411.1; 428/233; 428/236; 428/241;
428/243; 428/244; 428/283; 428/433; 428/438;
428/480; 428/200; 428/346; 428/913;
174/DIG. 8
[58] Field of Search ............... 428/47, 78, 251, 285,
428/286, 249, 413, 415, 423.1, 425.6, 411.1, 233,
236, 241, 243, 244, 283, 433, 438, 480, 200, 346,
913, 76, 68; 174/DIG. 8

[56] References Cited

U.S. PATENT DOCUMENTS 2,915,413 12/1959 Ragan et al. .
3,131,240 4/1964 Kirkpatrick ........................ 428/34.9
3,616,152 10/1971 Chandler ............................. 428/346
3,669,157 6/1972 Woodall, Jr. et al. ....... 174/DIG. 8
4,370,369 1/1983 Bonis .
4,803,105 2/1989 Kretow et al. ........................ 428/40
4,803,108 2/1989 Leuchten et al. .................... 428/118

FOREIGN PATENT DOCUMENTS 0265200 4/1988 European Pat. Off. ........... 428/34.9
1293456 10/1972 United Kingdom .
2048720 12/1980 United Kingdom ................ 428/346

Primary Examiner—José G. Dees
Assistant Examiner—P. J. Ryan
Attorney, Agent, or Firm—Curtis, Morris & Safford

[57] ABSTRACT

The multi-layer body member consists of a support member, e.g. a glass fiber tissue impregnated with a thermosetting resin which is covered by a layer of thermosetting adhesive resin. In order to protect the sticky surface of the adhesive resin, a protection foil made of a material shrinking under the influence of heat is provided. The foil comprises slits which open to apertures after a preliminary heat treatment such that an essential portion of the sticky resin surface is freely exposed. Thus, the need to remove the protection foil prior to applying the multi-layer body member to the surface to be reinforced is removed.

15 Claims, 2 Drawing Sheets

MULTI-LAYER BODY STRUCTURE FOR THE REINFORCEMENT OF A PANEL AND A METHOD OF REINFORCING A PANEL

BACKGROUND OF THE INVENTION

The present invention relates to a multi-layer body structure for the reinforcement of a panel and to a method of reinforcing a panel with the multi-layer body structure.

More particularly, the invention relates to a reinforcing member adaptable to the reinforcement of a panel formed of metal, plastic or sheet molding compound.

Such multi-layer structures may comprise a first, fiber-reinforced layer, e.g. a glass fiber tissue impregnated with a thermosetting resin material, one surface thereof being coated with a second layer consisting of a further, thermosetting resin, said second layer serving as an adhesive layer. A multi-layer body member of this kind may be used to reinforce flat or curved panels like, for instance, sheet metal portions by placing a piece of the multi-layer body member with its sticky resin surface onto the sheet metal portion to be reinforced and subsequently subjecting it to a heat treatment. Thereby, on the one side, an adhesion of the multi-layer body member to the sheet metal portion is effected and, on the other side, the resin layers are cured such that a stiff connection between the sheet metal portion and the fiber reinforced layer results. In this way, an essential stiffening of the sheet metal portion may be achieved in a very simple manner without the disadvantage of substantially increasing the weight of the panel to be reinforced.

In order to make sure that the multi-layer body member can easily be applied to the sheet metal portion to be reinforced, the resin layer usually has a sticky surface such that the applied multi-layer body member adheres in the required position to the sheet metal portion until it is subjected to a heat treatment. However, one is forced to protect the sticky resin surface of the multi-layer body member up to the moment when it is used in order to protect the sticky resin surface from contamination and, further, in order to enable a plurality of multilayer body members to be stacked. In the prior art, such protection is in the form of a suitably treated paper sheet or a protection foil which can be removed from the multi-layer body member surface immediately prior to its application.

One of the most important disadvantages thereby is that the removal of the protection paper or the protection foil is an undesired additional operation step which hardly can be performed automatically. Particularly in the field of automobile construction in which such multi-layer body members are widely used and in which an important goal consists in the automation of as many operation steps as possible, this operation of removing the protection paper or the protection foil is considered as an undesired and time-consuming job which can be performed only by a human operator.

OBJECTS OF THE INVENTION

It is an object of the present invention to improve a multi-layer body member of the kind referred to hereinabove such that the above-mentioned disadvantages are avoided.

Particularly, it is an object of the invention to provide a multi-body member, the sticky resin surface thereof being protected and which can be stacked without the danger that one body member adheres to the next one, whereby an immediate application of the multi-layer body member to a sheet metal portion or the like is possible without the need to remove a protection paper or a protection foil.

It is a further object of the invention to provide a method of reinforcing a panel formed of metal, plastic, sheet moulding compound or the like which is well suited for automation and can be performed e.g. by a robot, i.e. which does not require any manual handling of a reinforcing member like removing a protection paper or foil prior to applying the reinforcing member to the panel to be reinforced.

SUMMARY OF THE INVENTION

To meet these and other objects, the invention provides a multi-layer body structure for the reinforcement of a panel, comprising an essentially flat reinforcing body member consisting of one layer or a plurality of layers, a layer of adhesive material applied to one surface of the reinforcing body member and a protective sheet or foil applied to the free surface of the adhesive material. The protective sheet or foil consists of a material shrinking under the influence of heat applied thereto and thereby lays open a considerable part of the free surface of the adhesive material upon shrinking.

In a further aspect the invention is directed to a reinforcing member adaptable to the reinforcement of a panel formed of metal, plastic or sheet molding compound. It comprises an essentially flat reinforcing sheet made of a fiber-reinforced thermosetting resin and an adhesive layer applied to the surface of said reinforcing sheet which is directed toward the surface of the panel onto which the reinforcing member is to be applied. The adhesive layer is a thermosetting resin material having a sticky surface directed toward the panel onto which the reinforcing member is to be applied, and a protective sheet or foil is provided covering said sticky surface. The protective sheet or foil consists of a material shrinking under the influence of heat applied thereto and thereby lays open a substantial part of the sticky surface of the adhesive material upon shrinking.

Thus, the multi-layer member can be subjected to a superficial heat treatment prior to its application to the panel to be reinforced whereby the foil shrinks to a fraction of its original size and thereby exposes the sticky surface of the adhesive layer. Consequently, the multi-layer body member adheres as usual on the portion of the panel to be reinforced. During the final heat treatment, which is required to cure the thermosetting resins of the reinforcing body member, the protection foil shrinks further and will be embedded in the adhesive layer such that it does not impair the intimate connection between the multi-layer body member and the surface of the panel to be reinforced.

According to a preferred embodiment, the protection foil is made of one piece and comprises a plurality of slits. Such a foil may be easily applied to the adhesive layer in the course of manufacturing the multi-layer reinforcing body member. Particularly, if said slits are arranged in rows extending parallel to each other and are offset to each other in adjacent rows, a mesh-like structure of the protection foil is obtained after the heat treatment of the foil whereby it shrinks, with the result that the adhesive layer is uniformly exposed over nearly the entire surface of the multi-layer body member. It is understood that the shape and the arrangement of the slits may vary depending on the situation of application and on the material of the protection foil.

According to another embodiment, it is possible to build up said protection foil by providing a plurality of small webs extending parallel to each other and arranged side by side. After the heat treatment, these webs shrink to the shape of vary narrow strips; consequently, nearly the entire adhesive surface is freely exposed.

In a still further aspect the invention is directed to a method of reinforcing a panel formed of metal, plastic or sheet molding compound by means of a reinforcing member consisting of an essentially flat reinforcing sheet made of a fiber-reinforced thermosetting resin, an adhesive layer applied to the surface of said reinforcing sheet which is directed toward the surface of the panel onto which the reinforcing member is to be applied, said adhesive layer being a thermosetting resin material having a sticky surface directed toward the panel onto which the reinforcing member is to be applied, and a protective sheet or foil covering said sticky surface, said protective sheet or foil consisting of a material shrinking under the influence of heat applied thereto and thereby laying open at least a part of said sticky surface of said adhesive material upon shrinking.

According to the method of the invention, in a first step, at least the surface of said protective sheet or foil is heated to a first temperature to effect a shrinking of said protective sheet or foil whereby a part of said sticky surface is laid open.

In a second step, said reinforcing member is applied onto the panel to be reinforced, said sticky surface facing the surface of said panel.

In a third step, said reinforcing member is further heated to a second temperature during a sufficient time to effect curing of said reinforcing sheet and said adhesive layer.

BRIEF DESCRIPTION OF THE DRAWINGS

In the following, some embodiments of the invention are further described, with reference to the attached drawings. In the drawings.

DESCRIPTION OF SOME PREFERRED EMBODIMENTS

Figure 1:
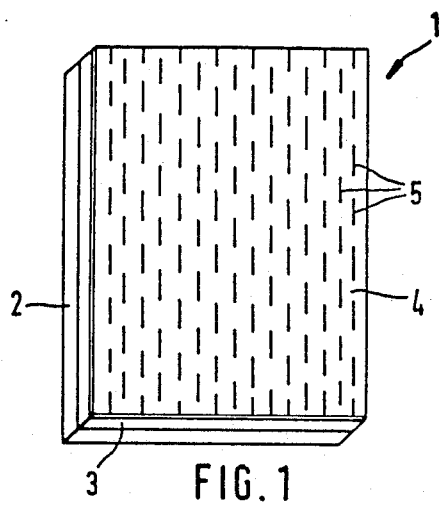
FIG. 1 shows a diagrammatic top view of a first embodiment of a multi-layer body member according to the invention prior to the first, superficial heat treatment.
Figure 2:
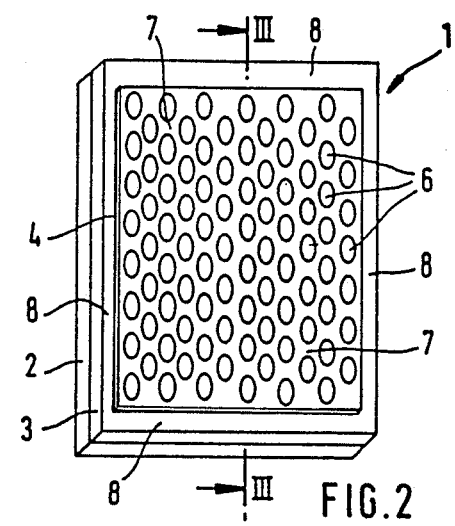
FIG. 2 shows a diagrammatic top view of a first embodiment of a multi-layer body member according to the invention after the first, superficial heat treatment.
Figure 3:
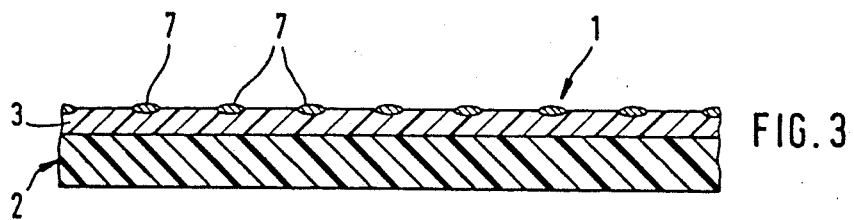
FIG. 3 shows a partial sectional view along the line III—III in FIG. 2 in a larger scale.
Figure 4:
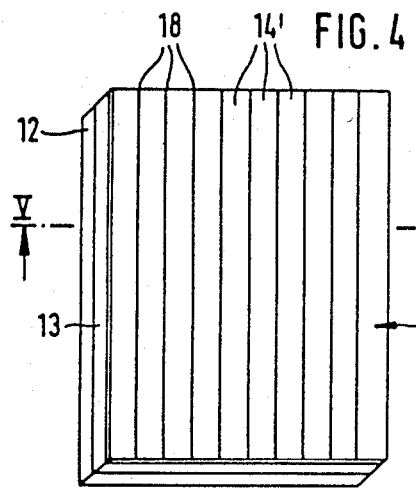
FIG. 4 shows a diagrammatic top view of a second embodiment of a multi-layer body member according to the invention prior to the first, superficial heat treatment.

The first embodiment of a multi-layer body member, generally designated with reference numeral 1 and shown in FIGS. 1-3, comprises a support member 2 which may consist, for instance, of a glass fiber tissue impregnated with a thermosetting resin and provided on one of its surfaces with a layer 3 consisting of a thermosetting adhesive resin. As the surface of the adhesive layer 3 preferably is made sticky in order to enable the multi-layer body member to be easily applied to a sheet metal portion to be reinforced without the need for further connecting means, a cover foil 4 is provided protecting the surface of the sticky adhesive resin from contamination and enabling pieces of multi-layer body members 1 cut into a desired size to be stacked without the danger that they adhere to each other.

The adhesive layer 3 can be integrally self-adhesive or sticky, or it can be provided with an adhesive or sticky layer on its exposed surface, depending on the application and the materials best suited for a specific application.

In order to avoid the need to remove the protection foil 4 prior to applying the multi-layer body member to the sheet metal portion to be reinforced, the invention provides that the foil is made of a material which shrinks upon heating. Such materials are known in the art and are marketed in a plurality of different embodiments.

According to a first embodiment of the invention, the foil 4 is made of one piece and comprises a plurality of slits 5 which are arranged in rows extending parallel to each other and which are offset to each other in adjacent rows. Initially, in the state as shown in FIG. 1, the slits 5 do not have any effect as they are closed; thus, the same protection of the sticky surface of the adhesive layer 3 is achieved as with a continuous foil without slits.

If it is desired to apply the multi-layer body member 1 onto a sheet metal portion to be reinforced, the body member 1 has to be subjected to a superficial heat treatment during a short period. Such heat treatment can be realized by means of a flame at the foil side or by passing the multi-layer body member with its foil side along an infrared heated. Thereby, the foil 4 shrinks and changes its shape to a net-like structure whereby the slits 5 open to oval apertures 6 (FIG. 2). Thus, a major part of the sticky surface of the adhesive layer 3 is freely exposed so that the multi-layer body member 1 can be fastened to the portion of the panel to be reinforced as usual by simply placing it thereon or by slightly pressing it to panel, e.g. to the sheet metal portion to be reinforced.

Additionally, the foil 4 shrinks as a whole such that edge portions 8 running along the edges of the adhesive resin layer 3 are completely laid open. This additional effect is highly desired since thereby the adhering of the body member 1 on the portion of the panel to be reinforced, prior to the final heat treatment, is much more pronounced. Thus, an improved protection against corrosion is achieved in the edge portions 8 because no underwashing, resulting eventually in a partial loosening of the body member 1, can result since the adhesive layer adheres on the panel to be reinforced with its entire edge surfaces 8. Such underwashing effects can occur if the body member 1 is e.g. connected to the inner surface of a car body which subsequently is washed and/or subjected to a priming operation before the final heat treatment is performed.

During the final heat treatment, the heat curing resin in the adhesive layer 3 will become more viscous and flows around the remaining lands 7 of the shrinked protection foil 4 (FIG. 3), with the consequence that essentially the entire surface of the sticky resin layer 3 can be used for the connection of the multi-layer body member 1 to a sheet metal portion or similar panel to be reinforced.

Figure 6:
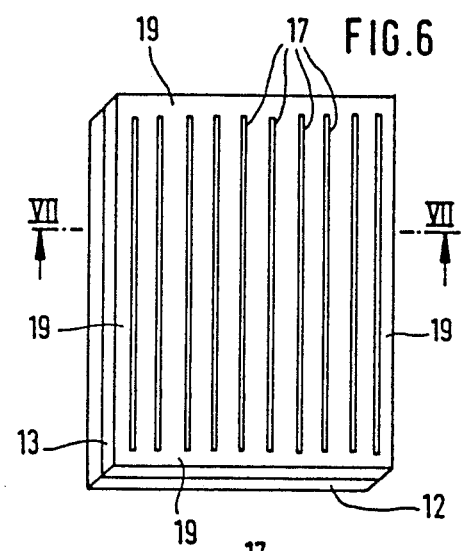
FIG. 6 shows a diagrammatic top view of a second embodiment of a multi-layer body member according to the invention after the first, superficial heat treatment.
Figures 5, 7:
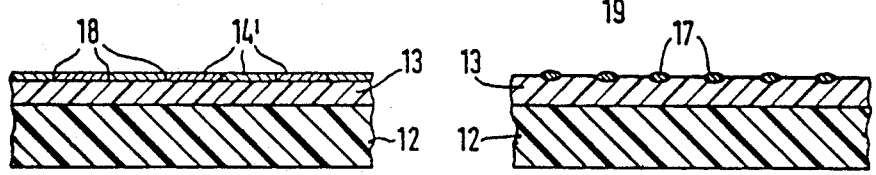
FIG. 5 shows a partial sectional view along the line V—V in FIG. 4 in a larger scale.
FIG. 7 shows a partial sectional view along the line VII—VII in FIG. 6 in a larger scale.

The multi-layer body member 11 according to a second embodiment shown in FIGS. 4–7 is of similar design and comprises for instance a glass fiber tissue 12 impregnated with a thermosetting resin and provided with a layer 13 consisting of a sticky adhesive thermosetting resin. The protection foil 14, again consisting of a material shrinking under the influence of heat, however, is built up by a plurality of single webs 14' arranged adjacent to each other and thereby providing the protection effect of a continuous foil (FIGS. 4 and 5), since the single webs 14' are separated from each other only by very narrow slits 18. After the heat treatment, the webs 14' shrink into the shape of narrow lands 17; consequently, essentially the entire surface of the sticky adhesive resin layer 13 is freely exposed again in order to enable the multi-layer body member 11 to be fastened to a panel, e.g. a sheet metal portion to be reinforced by simply pressing on (FIGS. 6 and 7).

In this case again, the effect is observed that the foil 14 additionally shrinks as a whole, particularly in the length dimension of the remaining lands 17, such that edge portions 19 of the sticky surface of the adhesive resin layer 13 are completely laid open; the result are the advantages which have been explained in connection with the previous embodiment.

Figures 8A, 8B:
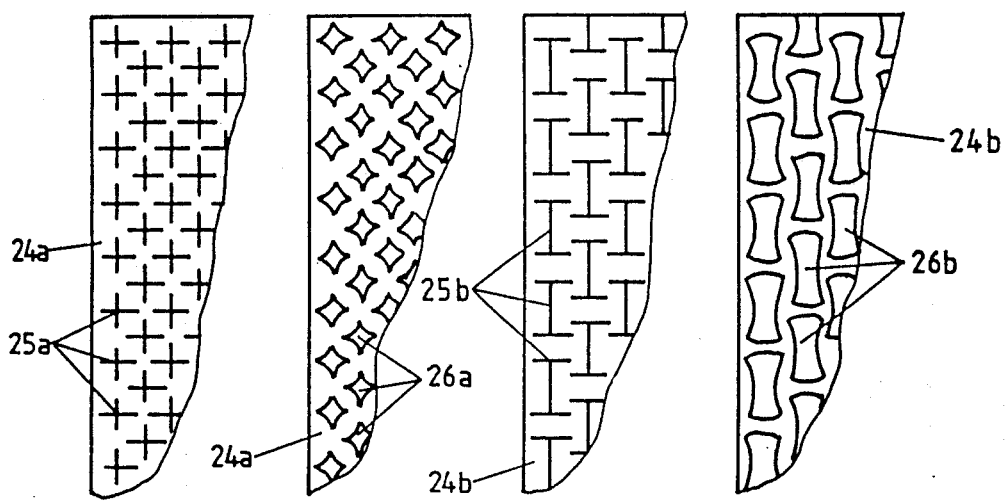
FIGS. 8a–8c show diagrammatic views of further possibilities regarding the shape and the arrangement of the slits provided in a protection foil consisting of one piece.
Figure 8C:
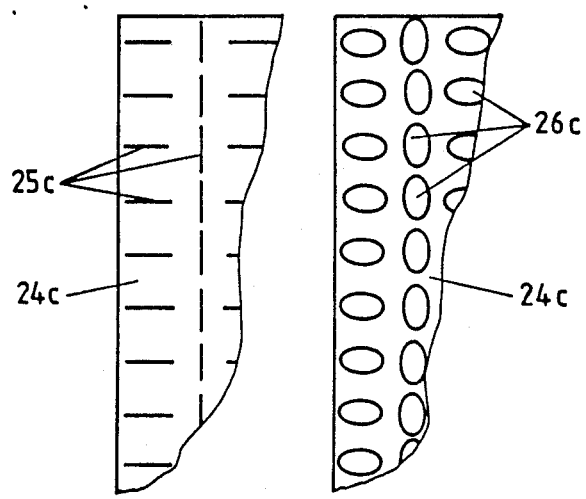

The FIGS. 8a to 8c diagrammatically show, in partial views, several further possibilities regarding the shape and the arrangement of slits in a protection foil consisting of one piece. In each Figure, the condition of the foil prior to the superficial heat treatment is shown on the left hand side and the condition of the foil after the superficial heat treatment on the right hand side.

According to the left hand side of FIG. 8a, the slits 25a in the foil 24a are cross-shaped and arranged in parallel rows side by side. The cross-shaped slits 25a of one row are offset with regard to the cross-shaped slits of the two adjacent rows in order to ensure that the lands between the slits 25a have approximately the same width. The foil 24a having been subjected to a heat treatment (the right hand side in FIG. 8a), the cross-shaped slits 25a open to cushion-shaped apertures 26a such that the foil 24a will have a net-like structure again.

According to the left hand side of FIG. 8b, the slits 25b in the foil 24b have a double-T shape and are arranged in parallel rows side by side. The slits 25b of one row are offset with regard to the slits of the two adjacent rows in order to ensure that the lands between the slits 25b have approximately the same width. The foil 24b having been subjected to a heat treatment (the right hand side in FIG. 8b), the double-T-shaped slits 25b open to approximately rectangular apertures 26b such that the foil 24b will have a net-like structure again.

According to the left hand side of FIG. 8c, the slits 25c in the foil 24c are simple straight slits and alternately arranged in lengthwise and crosswise direction in adjacent parallel extending rows. The foil 24c having been subjected to a heat treatment (the right hand side in FIG. 8c), the slits 25c open to oval apertures 26c, similar to the apertures shown in FIG. 2, such that the foil 24c will have a net-like structure again.

As already mentioned, the superficial heat treatment is effected at such a temperature and during a short period of time which effects a shrinking of the foil but which is not high and long enough, respectively, to effect curing of the resin layers. This may be realized without difficulties as shrink foils are marketed today which show a very high degree of shrinking at relatively low temperatures. Even if the shrinking process is not finished during the preliminary heat treatment, the freely exposed sticky resin surface has sufficient size to adhesively fasten the multi-layer body member to a sheet metal portion to be reinforced. During the final heat treatment the shrinking of the foil will be finished.

Finally, it should be mentioned that it is not absolutely necessary to provide the protection foil with slits of any kind. Depending on the material of the foil and of the adhesive resin layer, a first shrinkage of the foil is sufficient that the multi-layer body member may be securely fixed to the panel to be reinforced. During the second heat treatment, the foil will shrink to such a great extent that it does not cover any reasonable part of the sticky resin surface anymore, but it will be embedded in the material of the adhesive layer during said second final heat treatment.

The invention has been explained hereinbefore with regard to a body member comprising a glass fiber tissue impregnated with heat curing resin. However, it is understood that the basic principle of the invention may be used in connection with arbitrary multi-layer body members which at least comprise an outer adhesive layer having a sticky surface.

What we claim is:

1. A multi-layer body structure for the reinforcement of a panel, comprising:
    an essentially flat reinforcing body member consisting of one layer or a plurality of layers;
    a layer of adhesive material applied to one surface of said reinforcing body member;
    a protective sheet or foil applied to the free surface of said adhesive material;
    said protective sheet or foil consisting of a material shrinking under the influence of heat applied thereto and thereby laying open at least a part of said free surface of said adhesive material upon shrinking.

2. A multi-layer body structure according to claim 1, in which said protective sheet or foil is made of one piece and comprises a plurality of slits.

3. A multi-layer body structure according to claim 2, in which said slits are arranged in rows extending parallel to each other as well as offset to each other in adjacent rows.

4. A multi-layer body structure according to claim 3, in which said slits are cross-shaped and are arranged in rows extending parallel to each other as well as offset to each other in adjacent rows.

5. A multi-layer body structure according to claim 2, in which said slits have the shape of a double-T and are arranged in rows extending parallel to each other as well as offset to each other in adjacent rows.

6. A multi-layer body structure according to claim 2, in which said slits are arranged in side-by-side rows and extending alternately in the lengthwise and in the crosswise direction.

7. A multi-layer body structure according to claim 1, in which said protective sheet or foil consists of a plurality of small webs extending parallel to each other and closely arranged side by side.

8. A multi-layer body structure according to claim 1, in which said essentially flat reinforcing body member is a fiber-reinforced sheet made of a thermosetting resin and that said adhesive layer consists of a sticky, thermosetting resin applied to said fiber-reinforced sheet.

9. A reinforcing member adaptable to the reinforcement of a panel formed of metal, plastic or sheet molding compound, comprising:

an essentially flat reinforcing sheet made of a fiber-reinforced thermosetting resin;

an adhesive layer applied to the surface of said reinforcing sheet which is directed toward the surface of the panel onto which the reinforcing member is to be applied;

said adhesive layer being a thermosetting resin material having a sticky surface directed toward the panel onto which the reinforcing member is to be applied; and a protective sheet or foil covering said sticky surface;

said protective sheet or foil consisting of a material shrinking under the influence of heat applied thereto and thereby laying open at least a part of said sticky surface of said adhesive material upon shrinking.

10. A reinforcing member according to claim 9, in which said protective sheet or foil is made of one piece and comprises a plurality of slits.

11. A reinforcing member according to claim 10, in which said slits are arranged in rows extending parallel to each other as well as offset to each other in adjacent rows.

12. A reinforcing member according to claim 10, in which said sits are cross-shaped and are arranged in rows extending parallel to each other as well as offset to each other in adjacent rows.

13. A reinforcing member according to claim 10, in which said slits have the shape of a double-T and are arranged in rows extending parallel to each other as well as offset to each other in adjacent rows.

14. A reinforcing member according to claim 12, in which said slits are arranged in side-by-side rows and extending alternately in the lengthwise and in the crosswise direction.

15. A reinforcing member according to claim 9, in which said protective sheet or foil consists of a plurality of small webs extending parallel to each other and closely arranged side by side.

* * * * *

UNITED STATES PATENT AND TRADEMARK OFFICE
CERTIFICATE OF CORRECTION

PATENT NO. : 4,900,601
DATED : Feb. 13, 1990
INVENTOR(S) : Hälg et al.

It is certified that error appears in the above-identified patent and that said Letters Patent is hereby corrected as shown below:

Claim 4, line 1, change "3" to --2--.

Signed and Sealed this

Twelfth Day of February, 1991

Attest:

HARRY F. MANBECK, JR.

Attesting Officer        Commissioner of Patents and Trademarks